June 12, 1951 R. J. WATTS 2,556,457

PULSE WIDTH MODULATION

Filed Dec. 30, 1948 2 Sheets-Sheet 1

WITNESSES:
Ralph Carlisle Smith
Gene C. Newlin

INVENTOR:
Richard J. Watts
BY
Roland A. Anderson
Attorney

June 12, 1951 R. J. WATTS 2,556,457

PULSE WIDTH MODULATION

Filed Dec. 30, 1948 2 Sheets-Sheet 2

WITNESSES:

INVENTOR:
Richard J. Watts
BY

Patented June 12, 1951 2,556,457

UNITED STATES PATENT OFFICE 2,556,457

PULSE WIDTH MODULATION

Richard J. Watts, Los Alamos, N. Mex., assignor to the United States of America as represented by the United States Atomic Energy Commission Application December 30, 1948, Serial No. 68,268

3 Claims. (Cl. 332—14)

This invention relates to a system for transmitting slow rate of change modulations. More particularly, the invention is directed to a device for transmitting intelligence by varying the width of pulses.

Certain problems arise in the transmission of modulations having slow rate of change. For systems in telemetering, it is necessary to transmit a gradual growth or collapse of potential. The systems of the prior art are deficient in one or more respects if applied to transmissions of this type. In order that the present invention will be more easily understood a brief discussion of the modulation systems of the prior art is in order.

In the system of amplitude modulation the amplitude of a carrier current is varied above and below its normal value. In this system efficiency is of rather low order for the reason that modulation cannot be extended to 100 percent without risk of creating distortion and subsequent unreliability in communication. Further, this system of modulation is not readily adapted to the transmission of very slow rate of change modulation.

Another type of modulation of the prior art is frequency modulation. This system has the inherent disadvantage that a rather large frequency variation must be applied to the amplitude translator in order that the translator shall be able to generate workable amplitude variations in response to very slow frequency modulation.

Another system of modulation of the prior art is pulse time modulation, wherein pulses of constant amplitude and constant width are transmitted at intervals which correspond to the desired intelligence. This system has desirable characteristics although the required varying intervals between pulses results in a somewhat slowed transmission.

This invention is directed to a system which avoids the shortcomings of the above discussed prior art. In accordance with this invention a pulse width modulation system is described. The characteristics of the pulse width modulation system as herein described are such that a rapid transmission of intelligence with high signal-to-noise ratio is obtainable.

It is an object of this invention to provide a means for transmitting audio signals with a very low signal-to-noise ratio.

A further object of this invention is to transmit signals having a very slow rise and fall time.

A further object of this invention is to provide a means for telemetering slow changes in potential whether said potential is A. C. or D. C.

Other objects and advantages of the present invention will become apparent to persons skilled in the art from the following description of the presently preferred embodiment taken in connection with drawings made part of this specification.

Figure 1:
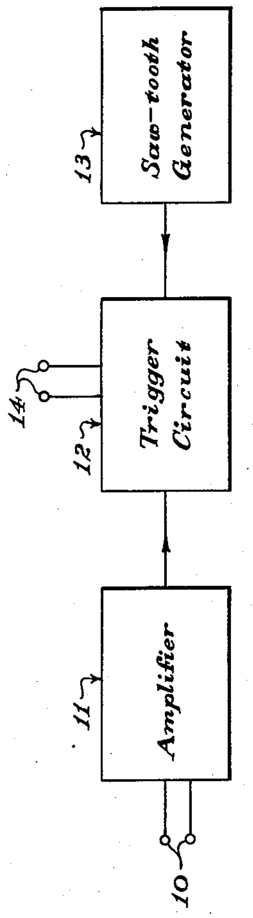

In the drawings, Figure 1 is a block diagram of a system constructed in accordance with principles herein described.

Figure 2:
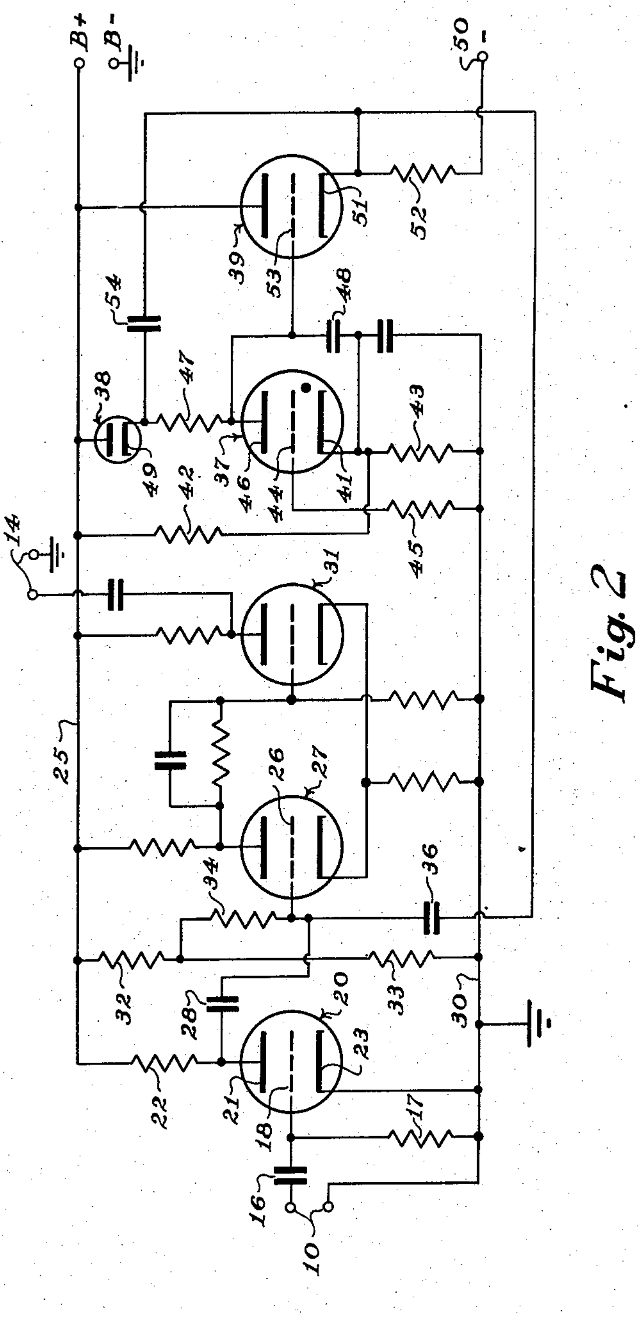
Figure 3:
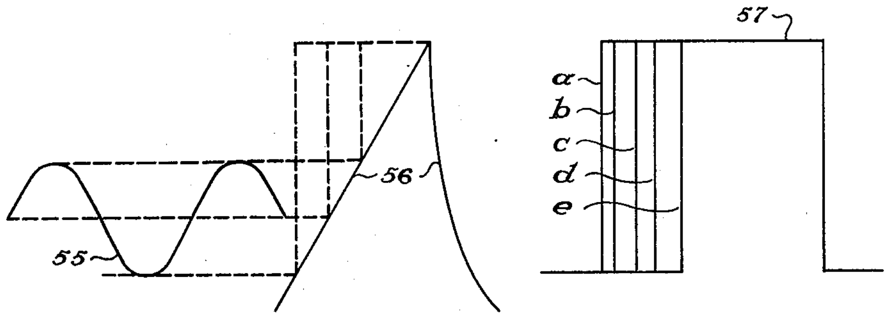
Figure 4:
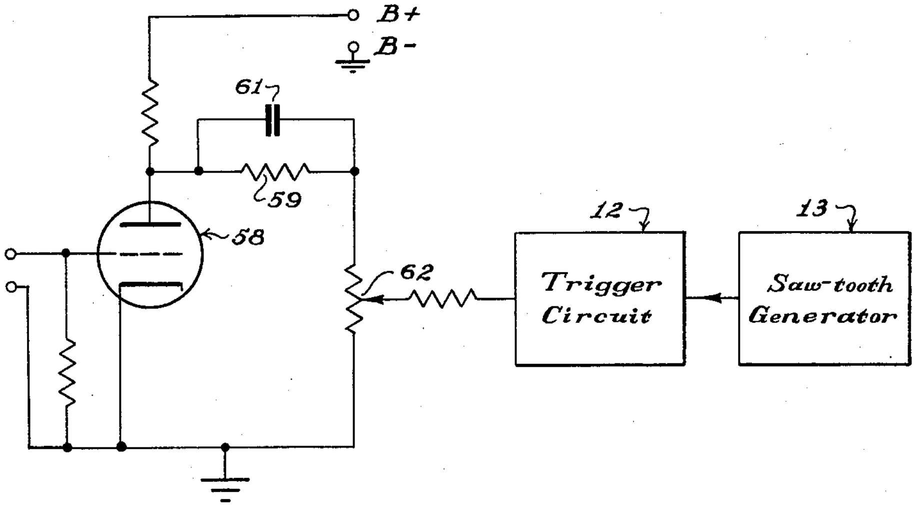

Figure 2 is a schematic wiring diagram of a pulse width modulation circuit for transmitting audio frequency signals. Figure 3 is a set of curves which illustrate the principle of operation of the device of Figure 2. Figure 4 is a schematic wiring diagram in part showing a second embodiment of the input circuit.

Referring to Figure 1, a block diagram is shown to illustrate the three essential components of the pulse width modulation circuit. A signal to be transmitted is impressed on input terminals 10 and is then fed through amplifier 11 which can be either resistance-coupled or direct-current coupled depending upon the particular application. The signal from amplifier 11 is impressed on the trigger circuit 12. A saw-tooth generator 13 impresses a saw-tooth voltage on the trigger circuit 12. The two signals are mixed at trigger circuit 12 to give an output at terminals 14 which is a square pulse which varies in width with the input signal that is to be transmitted.

Referring to Figure 2, the signal to be transmitted is impressed on control grid 18 of tube 20 by means of input terminals 10 through a resistance-coupled network consisting of condenser 16 and resistor 17. More particularly tube 20 is connected in the normal manner of an amplifier with the anode 21 maintained at a positive potential by connection through anode resistor 22 to the positive potential conductor 25. Cathode 23 is maintained at a ground potential by direct connection to the ground conductor 30. The variable signal impressed on grid 18 from the input terminals 10 is amplified and is impressed on control grid 26 of tube 27 through coupling condenser 28. Tube 27 is associated with tube 31 in the well known manner of the Schmitt-flip-flop trigger-circuit, in which the circuit triggers when a signal larger than the bias is impressed on the control grid 26 of tube 27 and then triggers back when the voltage drops below the bias value. Control grid 26 is maintained at a selected bias value by the voltage divider consisting of resistors 32 and 33 connected between positive conductor 25 and ground conductor 30. The potential at this point is impressed on control grid 26 through resistor 34. The bias on control grid 26 is maintained so as to take the largest variable input signals from the amplifier without triggering the trigger circuit. A saw-tooth generator signal is also impressed on control grid 26 of tube 27 through condenser 36 furnished by a sawtooth generator consisting of tubes 37, 38, and 39. The trigger circuit bias is maintained at a value such that the trigger circuit triggers on the positive rise and returns on the negative drop of the saw-tooth signal.

The saw-tooth generator consists of thyratron type tube 37 in which the cathode 41 is maintained at a positive potential by a voltage divider consisting of resistors 42 and 43 connected between positive potential conductor 25 and ground conductor 30. The control grid 44 of tube 37 is maintained negative with respect to cathode 41 by a connection to ground through grid leak resistor 45. The anode 46 of tube 37 is impressed with a positive potential by the series connection of resistor 47, diode 38 and positive potential conductor 25. A small condenser 48 is connected between anode 46 and the cathode 41 and is charged to the positive potential of conductor 25 through diode 38. When the thyratron tube 37 fires, the potential on anode 46 decreases abruptly and the potential of cathode 49 of diode 38 likewise decreases. Cathode 51 of tube 39 is maintained at a negative potential by connection to conductor 50 through resistor 52 and therefore during the charging of condenser 48 impresses a positive pulse on the upper end of resistor 47. This causes a positive pulse to be applied to the control grid 53 of tube 39 and the anode 46 of thyratron 37. Condensers 54 and 48 charging in opposite directions will give a saw-tooth signal with a linear rise on the cathode 51 of tube 39.

Assuming that the audio signal extends in frequency up to approximately 15 kilocycles, it is only necessary to sample up to twice the frequency of the audio signal. Therefore, in this instance, the components of the saw-tooth generator are selected to generate a saw-tooth signal having a frequency of about 30 kilocycles.

Referring to Figure 3, an audio voltage such as that impressed on the control grid of the trigger circuit of Figure 2 is illustrated by a sine wave 55, and is shown being impressed on a saw-tooth signal 56 which is also impressed on the trigger circuit of Figure 2. The resultant signal that is impressed on the trigger circuit of Figure 2 is indicated by the dotted lines. It is therefore seen that the signal from the output terminals 14 of the trigger circuit of Figure 2 will take the shape of a square wave illustrated by 57 in which the width of the square wave changes with amplitude as indicated by the parallel lines *a*, *b*, *c*, *d* and *e* of curve 57.

The device so far described is an embodiment of the invention for the transmission of intelligence of alternating current character.

To the end that the concept of this invention will be applicable to the transmission of intelligence originating as slow rate of change unidirectional potentials for instance, the invention is embodied in the modification shown in Figure 4.

Referring to Figure 4, triode type tube 58 is employed as a D. C. amplifier. This type of amplifier differs from the resistance-coupled amplifier of Figure 2 in the combination of resistor 59 and condenser 61 which are connected in parallel. Variable resistance 62 is employed to vary the bias on the trigger circuit so that the largest pulse received on the amplifier tube 58 does not trigger the trigger circuit. Block diagrams 12 and 13 are the same as those described in Figure 1 and the circuit of Figure 2.

It will thus be seen that what has been described herein is a simple pulse width modulation circuit. Many variations in the arrangement of the system or in the network described may be apparent to those skilled in the art without departing from the spirit and scope of the invention. Therefore it is understood that the invention is to be limited only by the claims as interpreted in view of the prior art.

What is claimed is:

1. In a pulse width modulation system, a transmitter comprising a flip-flop circuit, means for impressing input communication signals on said flip-flop circuit, means for biasing said flip-flop circuit normally at non-triggering condition, and means for impressing saw-tooth potentials on said flip-flop circuit whereby the algebraic sum of said saw-tooth potentials and said input communications signals activates the flip-flop circuit and thereby provides in the output thereof a rectangular pulse having a width proportional to the amplitude of the input communication signals.

2. In a pulse width modulation system, a transmitter comprising an amplifier and a flip-flop trigger circuit, said amplifier having impressed on the input thereof communication signals, and generating in the output thereof amplified communication signals; means for impressing said output communication signals on said trigger circuit, means for biasing said trigger circuit normally at non-triggering condition, means for generating linear saw-tooth potentials, means for impressing the saw-tooth potentials on said trigger circuit whereby the algebraic sum of said saw-tooth potentials and such output communications signals activates the trigger circuit and thereby provides in the output thereof a rectangular pulse having a width proportional to the amplitude of the input communication signals.

3. In combination with a flip-flop trigger circuit and a communication signal channel in a pulse width modulation system, a generator of linear saw-tooth potentials comprising a thyratron; a thermionic tube having a cathode, grid and anode; a vacuum diode having a cathode and an anode, a source of positive potential, a first and a second resistor serially connected and having a first and a second free end connected respectively to the source of positive potential and a unipotential conductor, the junction of said resistors being connected to the cathode of the thyratron to impose a positive potential thereon, a resistor connecting the thyratron grid to the unipotential conductor, a pair of capacitors serially connected, thereby providing a first and a second free connection which are connected respectively to the anode of the thyratron and the unipotential conductor, the common junction of the capacitors being connected to the thyratron cathode, a resistor being connected to the thyratron anode and the diode cathode, means connecting the diode anode to the positive potential source, a connection between the thermionic tube grid and the thyratron anode, and a condenser serially connected between the diode cathode and the thermionic tube cathode, a resistor connected between the thermionic tube cathode and a source of negative potential, said thermionic tube anode being connected to said source of positive potential; and a condenser connected between the thermionic tube cathode and the flip-flop trigger circuit whereby linear saw-tooth potentials are impressed on the flip-flop trigger circuit.

RICHARD J. WATTS.

REFERENCES CITED

The following references are of record in the file of this patent:

UNITED STATES PATENTS

| Number | Name | Date |
|---|---|---|
| 2,462,071 | Chatterjea et al. | Feb. 22, 1949 |